United States Patent [19]
Dent

[11] 3,909,561

[45] Sept. 30, 1975

[54] CIRCUIT USE WARNING DEVICE

[75] Inventor: Barry H. Dent, Concord, Calif.

[73] Assignee: Badger Meter, Inc., Richmond, Calif.

[22] Filed: Mar. 18, 1974

[21] Appl. No.: 451,760

[52] U.S. Cl. .......... 179/175.2 C

[51] Int. Cl.[2] .......... H04M 3/22

[58] Field of Search .......... 179/175.2 C, 1 MN, 81 E

[56] References Cited

UNITED STATES PATENTS

| | | | |
|---|---|---|---|
| 3,544,735 | 12/1970 | Olszewski | 179/175.2 C |
| R23,855 | 7/1954 | Peterson | 179/1 MN |

FOREIGN PATENTS OR APPLICATIONS

| | | | |
|---|---|---|---|
| 1,149,062 | 5/1963 | Germany | 179/1 MN |

OTHER PUBLICATIONS

Alston Subscriber Dial Service Measuring System, Models 370 and 389, 9-20-72.

*Primary Examiner*—Kathleen H. Claffy
*Assistant Examiner*—Douglas W. Olms
*Attorney, Agent, or Firm*—Lothrop & West

[57] ABSTRACT

The disclosure is a circuit use warning device particularly for telephonic installation which includes a voice communication circuit and a test circuit that can be connected and disconnected for exchange of signals. There is a warning signal emitter included in the device to furnish warning signals to the voice communication circuit. There is also an arrangement for withholding the warning signal for a predetermined time after the test circuit has been connected to the voice communication circuit.

1 Claim, 1 Drawing Figure

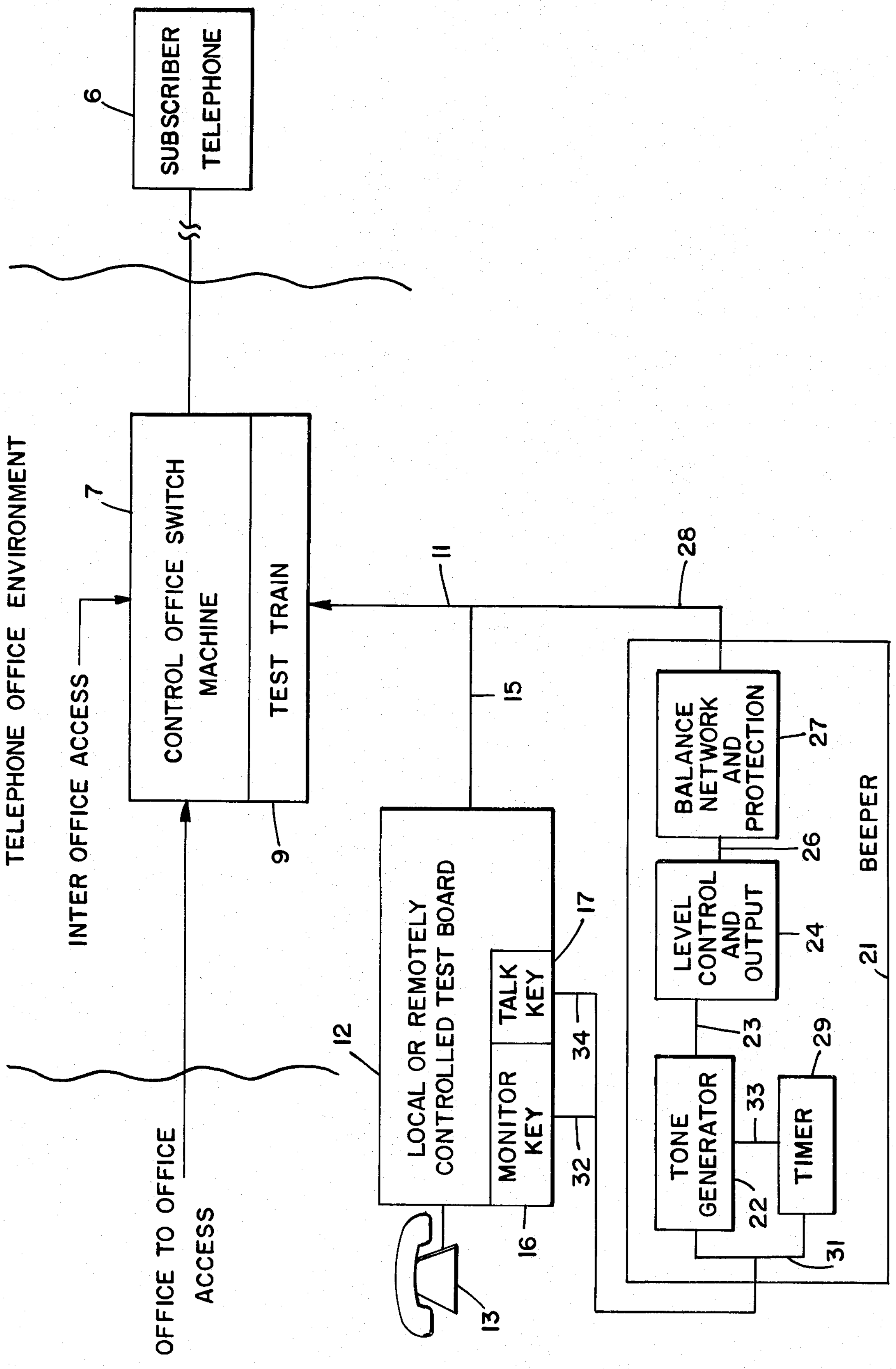
TELEPHONE OFFICE ENVIRONMENT
INTER OFFICE ACCESS
OFFICE TO OFFICE ACCESS
CONTROL OFFICE SWITCH MACHINE
TEST TRAIN
SUBSCRIBER TELEPHONE
LOCAL OR REMOTELY CONTROLLED TEST BOARD
MONITOR KEY
TALK KEY
BALANCE NETWORK AND PROTECTION
LEVEL CONTROL AND OUTPUT
TONE GENERATOR
TIMER
BEEPER
6
7
9
11
12
13
15
16
17
21
22
23
24
26
27
28
29
31
32
33
34

CIRCUIT USE WARNING DEVICE

In the operation of voice telephone equipment and other comparable devices, there is need upon occasion for invading the normal privacy of the communication line in order to perform necessary and permitted tests. Test or other operators, who are appropriately authorized, from time to time connect themselves through a proper instrument and a test circuit to the voice communication circuit and by simply listening or by performing various test procedures, determine whether or not the investigated line is in proper working order. While such authorized intervention in the line is ostensibly only for test or other authorized purposes, there has been an increasing tendency for telephone personnel not to confine themselves simply to the authorized operation or procedures. Sometimes they also impose on or continue on the voice circuit line and monitor the conversation without authorization. While the authorized procedures are proper and are necessary, the extension thereof or imposition thereof in lieu of normal testing or after the testing has been completed is unwanted and is distinctly disadvantageous.

It is therefore an object of the invention to provide means for permitting ordinary and appropriate testing yet to afford a warning signal for the subscriber's line so that in the event the test procedure is inordinately prolonged or if telephone personnel interpose on the line in an improper fashion, the warning to the subscriber permits him to discontinue his conversation or to enter a complaint or to take other appropriate action.

Another object of the invention is to provide a means for permitting the normal test procedures and for warning of unauthorized use of the test line.

Another object of the invention is to provide means for making the testing of communication equipment more carefully guarded so far as the subscriber's conversations are concerned.

A further object of the invention is to provide a suitable means for affording subscriber warning if the line is invaded, but without precluding the normal supervisory or test functions.

Another object of the invention is in general to provide an appropriate circuit use warning device.

A further object of the invention is to provide appropriate warning equipment which is extremely simple, compact, and inexpensive so that it is feasible to utilize it not only in connection with new circuitry being installed, but likewise to apply it to circuitry already in existence.

A further object of the invention is in general to provide an improved circuit use warning device.

Other objects of the invention are attained in the embodiment of the invention described in the accompanying description and illustrated in the accompanying drawing, in which:

The FIGURE is a block diagram of a typical installation of a circuit use warning device in a voice communication environment.

In the communications field, there are many instances in which an appropriate circuit use warning device can be employed but for ease of explanation herein, the adaptation is directed to an arrangement in which the customary communications system is utilized for voice communication.

In this particular environment there is provided a subscriber's station 6 of the usual telephonic kind. For illustration, this is assumed to be a station remote with respect to a central station 7 provided with the customary telephone switching equipment so that the remote subscriber 6 can be connected into the customary communications network. At the central station, as is customary, there is provided the normal voice circuit test train 9. This is unchanged by the present arrangement.

To the test train is connected or can be connected a voice circuit 11 for use by a test operator. That operator is provided with a local or remotely controlled test board 12 that may well include the customary transmitter and receiver 13 and may also include a control device having a monitor key 16. When actuated, the monitor key permits the test operator to receive on his receiver 13 communications information originating at the subscriber's station 6 and going through the central office 7 and the test train 9 as well as the circuit 11 and through a conductor 15 to the test board 12.

In this fashion, the test operator can listen in on the subscriber's connected circuit and can also perform various other tests as customarily done in connection with voltage drop across the line or current available in the line and the like. In the usual case, the test operator in connection with his test board 12 also has a talk key 17 connecting his transmitter 13 to the circuit 11 so that he can communicate with the central office or, in some instances, can communicate with the remote subscriber 6.

With this arrangement as so far described, the test operator can easily connect his instrument to the subscriber's instrument and can readily listen to the signals emanating from the subscriber's station. While this is acceptable and permissible for test purposes, it should not be carried out for purposes other than for test. Test operators are normally instructed not to do any unauthorized listening and in the main do not do so but there are instances, of increasing frequency, in which undisciplined or careless operators do in fact listen in the receiver 13 to the conversation at the subscriber's station 6.

To overcome any such operator and to restrict or confine the test operation to appropriate purposes, I have provided a circuit use warning device, generally designated 21. This device, referred to as a "beeper", incorporates an audible tone generator 22 of known construction. When energized this is effective periodically to emit a beep tone. The tone generator is joined by a connector 23 to a level control and output mechanism 24 which regulates the amount of beep signal transmitted. In turn, this is connected by a conductor 26 through a balance network 27 and protection device of the customary nature. The device 27 is joined by a conductor 28 to the normal voice circuit test train 9. When connected and energized, the beeper 21 affords a periodic tone signal impressed on the normal circuitry and audible at the subscriber's station 6. If the arrangement were only as described, then each time a proper test were made, the subscriber would be aware thereof because of the presence of the beep signal in his instrument. That is not a desirable arrangement since the necessary testing would be accompanied by annoying and unnecessary warning signals to the subscriber.

In accordance with my invention, I particularly provide in connection with the tone generator 22 a timer 29 having a connection 31 to a line 32 joining the monitor key 16 and a line 34 joining the talk key 17 to the timer 29. The timer is joined by a conductor 33 to the tone generator 22. With this arrangement, the connection of the test board 12 to the subscriber's station 6 by operation of either the monitor key 16 or the talk key 17 is effective through the conductors 32 or 34 not only to energize the audible tone generator 22, but more particularly to energize the timer 29 and to start such timer into operation. The effect of the operating timer 29 is to inhibit or hold off output from the tone generator 22 or to suppress the tone generator and to afford no warning signal to the subscriber station 6 until after the expiration of a predetermined time interval. Such time interval is chosen or predetermined to afford adequate time to carry out all of the normal authorized functions. Such functions are therefore performed under circumstances no different than the ordinary routine and can be easily completed before the time interval expires. At the end of the predetermined time interval, however, the timer 29 either enables the tone generator 22 or connects the tone generator 22 in such a fashion that a beep signal is then introduced to the connected circuitry and becomes audible at the subscriber's station 6. The occurrence of the beeper signal and its continuous repetition while the test circuit is connected, is adequate warning to the subscriber that his line is being monitored. He then can take any appropriate action.

I have thus provided a simple, inexpensive and compact piece of equipment which can be utilized for new installation or can be applied to older installations and which in no wise interferes with legitimate and appropriately conducted monitoring or line testing operations yet which does impress a warning signal on the line for the benefit of the subscriber, in the event the authorized procedure is not appropriately terminated or in the event the telephone operator simply remains on the line to eavesdrop.

What is claimed is:

1. In a circuit use warning device comprising a voice communication circuit, a test circuit, selector means for connecting said test circuit to said voice communication circuit and a warning signal emitter, the improvement comprising means for connecting said emitter in said test circuit to furnish warning signals to said communication circuit, and means responsive to operation of said selector means for withholding said signals for a predetermined time after operation of said selector means.

* * * * *